United States Patent

[11] 3,582,090

| [72] | Inventors | Jerry L. Lott;<br>Hadi T. Hashemi, both of Norman, Okla. |
|---|---|---|
| [21] | Appl. No. | 773,837 |
| [22] | Filed | Nov. 6, 1968 |
| [45] | Patented | June 1, 1971 |
| [73] | Assignee | E-C Corporation<br>Dallas, Tex.<br>Continuation-in-part of application Ser. No. 598,423, Dec. 1, 1966, now Patent No. 3,431,747. |

[54] FACE SEAL STRUCTURE
15 Claims, 12 Drawing Figs.

[52] U.S. Cl. ................................................. 277/63,
277/74, 277/75, 277/81, 137/608
[51] Int. Cl. ........................................................ F16j 15/16
[50] Field of Search.......................................... 277/63, 65,
74—77, 81, 96; 137/608

[56] References Cited
UNITED STATES PATENTS

| 2,906,565 | 9/1959 | Scherba | 277/65X |
|---|---|---|---|
| 3,222,077 | 12/1965 | Snabes | 277/74X |
| 3,400,939 | 9/1968 | Jones | 277/75X |
| 1,968,390 | 7/1934 | Hamilton | 137/608 |

*Primary Examiner*—Houston S. Bell, Jr.
*Attorney*—Dunlap, Laney and Hessin

ABSTRACT: A face seal structure for sealing around intermittently communicating ports formed through two parallel planar faces which move relative to each other due to the rotation of one of the faces about a rotational axis extending substantially normal thereto. The seal structure includes a rigid seal plate between the faces and having parallel planar surfaces which are parallel to the faces. The seal plate is keyed to a first of the faces and has at least one opening through it which is aligned with a port through the face to which it is keyed, and which is periodically alignable with at least one port through the second face. A first sealing element of high shear strength and having a flat bearing surface of low coefficient of friction sealingly engages the second face, and is secured on one of the surfaces of the plate around the opening therethrough. A second sealing element is positioned between, and sealingly engages, the seal plate and the face to which the plate is keyed. Each of the first and second sealing elements defines an area within itself which includes the opening through the plate, and each is geometrically configured and located around the opening through the plate so that minimum force due to the pressure of fluid passed from one port to the other through the opening in the plate acts at all times during relative movement between the faces to bias the first sealing element into sealing contact with the second face.

INVENTORS
JERRY L. LOTT &
HADI T. HASHEMI
BY
ATTORNEYS

INVENTORS
JERRY L. LOTT &
HADI T. HASHEMI
BY
ATTORNEYS

FACE SEAL STRUCTURE

RELATED APPLICATIONS

This application is a continuation-in-part of our Pat. application Ser. No. 598,423 filed Dec. 1, 1966 now U.S. Pat. No. 3,431,747, and entitled "Engine for Exchanging Energy Between High and Low Pressure Systems."

BACKGROUND OF THE INVENTION

1. Field of the Invention

This invention relates to seal structures, and more particularly, to face seals adapted to simultaneously sealingly engage two substantially parallel planar faces moving relative to each other so that the seal is subjected to shearing forces.

2. Brief Description of the Prior Art

There is general recognition in the field of seal technology that it is difficult to provide a seal which will effectively prevent the escape of a fluid from two communicating ports located respectively in two opposed, substantially parallel, planar surfaces or faces which move relative to each other due to the rotation of one or both of the faces about an axis or axes extending substantially normal to the planes of the faces. The difficulty stems in large part from the fact that the relative movement of the faces with respect to each other subjects to a shearing force, any material functioning as a seal around the communicating ports. The seal material is moreover subjected to an abrupt change in the magnitude of the forces acting on the seal material as the ports in the two faces pass into and out of communication with each other. Less difficulty is, of course, encountered where a face seal of the type which includes an annular sealing member carried by a rotating shaft is used to establish a seal between such shaft and a surrounding mandrel or housing. The same is true where the seal is carried on the surrounding housing and seals against the adjacent rotating shaft. Here there is no problem of ports moving across the sealing element periodically with a resulting tendency for the seal to be pressed into the port and sheared off, or at least to be subjected to large magnitude changes in the force acting against the seal due to the introduction to one side thereof of a pressurized fluid which may be passed through the ports.

One proposal to provide a face seal around intermittently communicating ports located in two opposed, relatively moving, parallel faces is that which is disclosed in copending U.S. Pat. application Ser. No. 598,423 filed Dec. 1, 1966, referred to above. There is described in the referenced patent application, a face seal structure used for sealing between intermittently communicating ports formed through a stationary end plate and the planar end face of a rotating rotor having bores extending therethrough and terminating in the ports which are placed in communication with the ports in the end plate. The seal in that instance is developed by the freezing of a liquid material passed through the bores in the rotor and into the port or ports located in the end face as such liquid leaks between the planar face of the end plate and the adjacent planar face of the rotor. This seal works well in many applications, but by virtue of its reliance upon a solidifiable material moved through the apparatus and subjected to leakage between the planar, relatively moving faces, is best suited for use with easily frozen material, such as water, and is less well suited for use with some other materials which may be passed through the bores in the rotor and into the intermittently communicating ports in the end plate.

BRIEF DESCRIPTION OF THE PRESENT INVENTION

The present invention provides an improved face seal structure which derives its improvement over prior similar structures from the specific properties of the material of which a portion of the seal structure is constructed, as well as from the geometry of the seal structure. Broadly described, the seal structure of the present invention comprises a rigid seal plate having at least one opening therethrough, and having a pair of opposed surfaces adapted to extend substantially parallel to a pair of parallel, monoplanar faces having ports therein which are to be communicated with each other through the opening in the seal plate. This communication is intermittent due to the movement of one of the faces relative to the other as at least one of the faces is rotated about an axis extending normal thereto, and due to the inclusion in the seal structure of means for keying the seal plate to one of the faces. To prevent leakage of fluid between the faces, sealing elements on opposite sides of the plate are provided around the opening in the plate. One of these sealing elements is a low coefficient of friction, high shear strength material which has a substantially monoplanar bearing surface forming a bearing between the seal plate and the face to which the seal plate is not keyed. This sealing element and the seal plate may be one integrally formed element made of the same material. The second sealing element is positioned between, and sealingly engages, the seal plate and the ported face to which the seal plate is keyed.

The first and second sealing elements each enclose an area on the opposed surfaces of the seal plate, which area includes, but is not limited to, the area of the opening through the plate. The size of these enclosed areas, and the geometry of the sealing elements is such that a small force due to liquid pressure will always, during relative movement between the faces, act tending to bias the plate away from the face to which it is keyed.

In a specific application of the face seal structure of the invention, the seal plate and the first and second sealing elements associated therewith are used in conjunction with an axially bored cylindrical rotor and a pair of spaced end or retainer plates to form an engine for exchanging energy between high and low pressure systems. An engine of this type is described in copending application Ser. No. 598,423 to which reference has hereinbefore been made.

From the foregoing general description of the invention, it will have become apparent that it is an important object of the invention to provide an improved face seal structure which can be utilized for sealing against the escape of high-pressure fluid between two parallel, substantially monoplanar faces during the movement of one of these faces relative to the other and as such fluid is being passed from a port in one of the faces into a port in the other face as such ports move into and out of registry with each other.

A more specific object of the invention is to provide a face seal structure which provides an effective fluid seal between two parallel, monoplanar faces while offering minimum resistance to the movement of one of the faces relative to the other.

Yet another object of the invention is to provide a face seal which can be economically constructed and which is not rapidly destroyed or weakened by the passage across the seal of a port or aperture formed in one of two faces between which the seal is established.

In addition to the described objects and advantages, additional objects and advantages will become apparent as the following detailed description of the invention is read in conjunction with the accompanying drawings which illustrate the invention.

3

BRIEF DESCRIPTION OF PREFERRED EMBODIMENTS OF THE INVENTION

Figure 1:
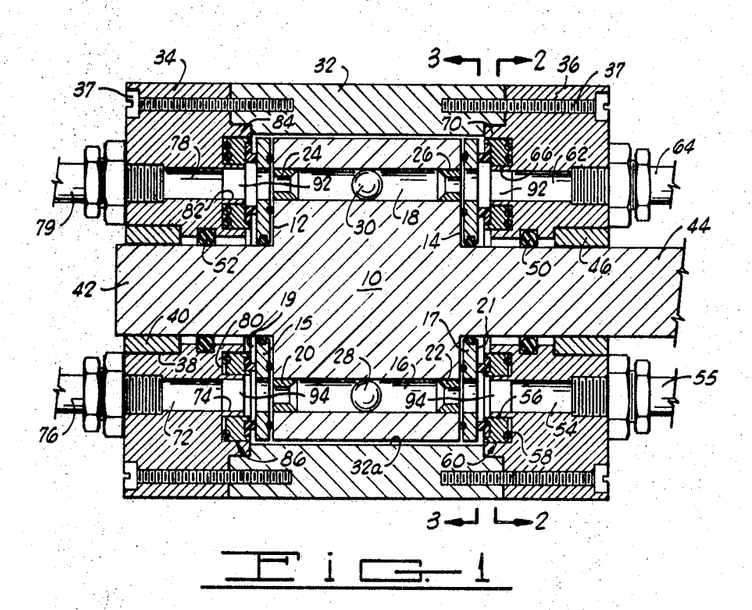
FIG. 1 is a view partially in section and partially in elevation of an engine for exchanging energy between high and low pressure systems, which engine incorporates and utilizes the face seal structure of the present invention.

In order to more clearly explain the operational principles of the seal structure of the present invention, as well as to facilitate description of a preferred application of the seal structure of the invention in combination with certain additional structure to form an energy exchange engine for exchanging energy between high and low pressure systems, reference will initially be made to FIG. 1 which shows an energy exchange engine of this type having the seal structure of the present invention incorporated therein. The engine includes a solid cylindrical rotor 10 which has a pair of spaced end faces 12 and 14. Secured to the end faces 12 and 14 are a pair of wear plates 15 and 17 which have substantially planar end faces 19 and 21 which extend substantially parallel to each other. Extending through the rotor 10 in an axial direction and through the wear plates are a plurality of spaced, substantially parallel bores of generally circular cross section. Two of the axially extending bores are employed in the embodiment of the invention depicted in FIG. 1 and are designated by reference numerals 16 and 18. It will be noted that the bores 16 and 18 each open at their opposite ends in the end faces 19 and 21 of the wear plates 15 and 17, respectively.

Pressed into the two end portions of each of the bores 16 and 18 are ball stops. The ball stops at the opposite ends of the elongated, axially extending bore 16 are designated by reference numerals 20 and 22, and those at opposite ends of the elongated, axially extending bore 18 are designated by reference numerals 24 and 26. A small spherical member or ball 28 is rollably mounted in the axial bore 16, and a spherical member or ball 30 is rollably mounted in the bore 18.

Surrounding the cylindrical rotor 10 is a housing 32. The housing 32 has an internal cylindrical wall 32a which is preferably positioned closely adjacent, but out of contact with the outer peripheral wall of the rotor 10. It will be noted in referring to FIG. 1 that the housing 32 is of greater axial length than the rotor 10 so that it projects a short distance beyond the end faces 19 and 21 of the wear plates 15 and 17. A pair of end or closure plates 34 and 36 are secured to the housing 32 by axially extending bolts 37.

The closure plate 34 is provided with a central recess 38 in which is mounted an annular bearing 40 for journaling a central stub shaft 42 projecting axially from the end face 12 of the rotor 10 through a central aperture in the wear plate 15. Directly opposite the stub shaft 42 on the other end of the rotor 10 and projecting from the end face 14 thereof through a

4 central aperture in the wear plate 17 is a drive shaft 44 which extends through a central bore in the closure plate 36 and is adapted to be connected at its outer end to a suitable source of power, such as an electric motor or the like (not illustrated). The drive shaft 44 is journaled in a suitable bearing 46 and may be sealed against fluid leakage by an O-ring seal 50 if desired. As will be later explained, however, the face seal structure of the present invention reduces and in many cases eliminates the need for the O-ring seal 50 and similarly eliminates or reduces the need for another optional O-ring seal 52 disposed around the stub shaft 42 for sealing this shaft with respect to the closure plate 34.

An elongated, low pressure fluid inlet port or passageway 54 extends through the closure plate 36 in a direction substantially parallel to the bore through this closure plate and receives low pressure fluid from a suitable conduit 55. The low-pressure fluid inlet port 54 opens into a built-up arcuate retainer flange 56 which has the closed, area-defining configuration best illustrated in FIG. 2. The arcuate retainer flange 56 extends axially from a face 58 of the end plate 36 and functions to key a seal plate designated generally by reference numeral 60 to the closure plate 36 in a manner hereinafter described. It will be noted in referring to FIG. 1 that the low-pressure fluid inlet port 54 is positioned in the closure plate 36 so that it is aligned with the axially extending bore 16 in the rotor 10 and wear plate 17 when the rotor is in the position illustrated in FIG. 1.

A high pressure fluid discharge passageway or port 62 is provided through the closure plate 36 on the opposite side thereof from the low pressure inlet port 54 and is positioned for alignment with the axially extending bore 18 in the rotor 10 and wear plate 17 when the rotor is in the position illustrated in FIG. 1. The high-pressure fluid discharge port 62 communicates with a high-pressure fluid discharge conduit 64 which is secured by a suitable fitting to the closure plate 36. The high-pressure fluid discharge port 62 communicates with an area circumscribed by an arcuate seal plate retainer flange 66 which is similar in configuration to the arcuate seal plate retainer flange 56 hereinbefore described. It will be noted in referring to FIG. 2 of the drawings that the closure plate 36 further includes an annular, outer seal plate retaining flange 70 which projects from the face 58 of the seal plate 36 in an axial direction with relation to the rotor 10.

In the embodiment of the invention illustrated in FIG. 1, the closure plate 34 is constructed substantially identically to the closure plate 36 with a low-pressure fluid discharge passageway or port 72 extending therethrough and communicating with the zone inside of an arcuate seal plate retainer flange 74. The low-pressure fluid discharge port 72 discharges fluid into a low-pressure discharge conduit 76 connected thereto by a suitable fitting. A high-pressure inlet passageway or port 78 is formed through the closure plate 34 on the opposite side thereof from the low-pressure fluid discharge port 72 and opens through a face 80 of the closure plate 34 into the zone defined by and enclosed within an arcuate seal plate retainer flange 82. An annular outer seal plate retaining flange 84 is provided on the closure plate 34 in correspondence to the annular, outer seal plate retaining flange 70 provided on the closure plate 36.

As will be hereinafter explained in greater detail, during the operating of the energy exchange engine depicted in FIG. 1, the rotor 10 and wear plates 15 and 17 carried thereby are driven in rotation relative to the closure plates 34 and 36 which are retained stationary. Fluids are introduced to the bores in the rotor during such rotation by the communication of these bores through the wear plates with the several ports 54, 62, 72, and 78 formed through the closure plates 34 and 36. In order to achieve the transfer of fluid from these ports in the closure plates to the bores 16 and 18 in the rotor 10 at such time as the ports may be aligned with these bores, it is necessary to provide a seal structure to prevent loss of the fluids between the closure plates and the opposed end faces 12 and 14 of the rotating rotor.

Figure 4:
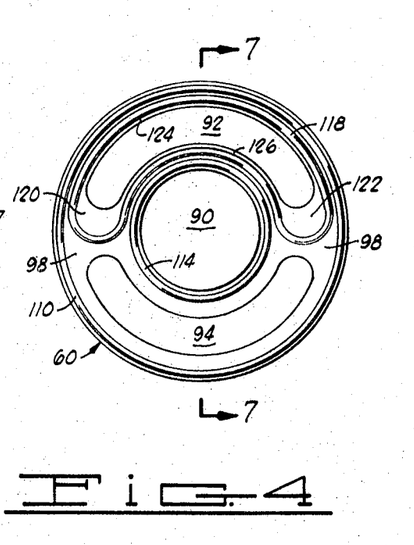
FIG. 4 is a view in elevation of the seal plate used in the seal structure of the invention as the seal plate appears from the side thereof which is keyed to one of the opposed surfaces between which the seal structure is to seal.
Figure 5:
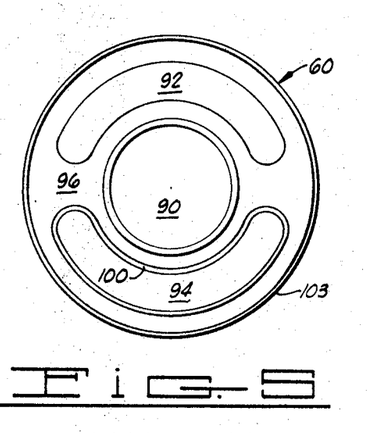
FIG. 5 is a view in elevation of the seal plate showing the appearance of one side of the seal plate when one of the sealing elements is removed.
Figure 6:
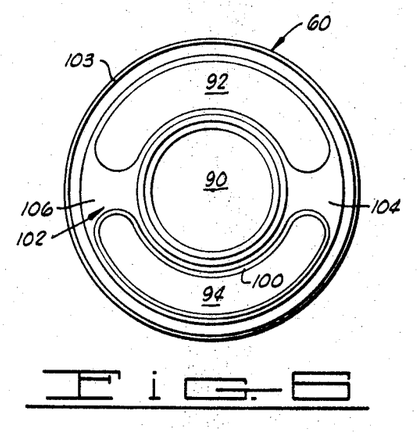
FIG. 6 is a view in elevation of the seal plate utilized in the seal structure of the invention showing the opposite side of the seal plate from that illustrated in elevation in FIG. 4.

To this end, the improved face seal structure of the present invention is provided. This seal structure may be said to include, in addition to the seal plate retainer flanges formed on the end plates 34 and 36 and hereinbefore described, the seal plates 60 and 86 and associated sealing elements to be hereinafter described. Since the seal plates 60 and 86 are substantially identical in construction and cooperate with their respective closure plates 34 and 36 in substantially the same manner, only the seal plate 60 will be described in detail. The seal plate 60 is illustrated in FIG. 5 as one side of the plate appears in elevation without an associated, low coefficient of friction, high shear strength sealing element attached thereto. The seal plate is shown in section in FIGS. 1 and 7, and is shown in FIG. 4 in elevation as the opposite side thereof from that depicted in FIG. 5 appears when a second sealing element is secured to such opposite side. The illustrations of the seal plate appearing in FIGS. 4, 5 and 6 depict the circular or discshaped configuration of the seal plate, and show the large central aperture 90 which is provided therein for the accommodation of the drive shaft 44.

The seal plate 60 is provided with a pair of circumferentially spaced, arcuate openings 92 and 94 formed therethrough between a pair of opposed, substantially parallel planar faces 96 and 98. The seal plate 60 can be made of substantially any rigid material, and the arcuate openings 92 and 94 are preferably symmetrically arcuate and extend over approximately one-third of the entire distance around the central opening 90. The illustrated shape of the openings 92 and 94, though preferred, is not, however, critical to the functioning of the present invention, and is a design which is most suitably included in the energy exchange engine representing one use of the seal structure of the present invention simply for the purpose of allowing a maximum period of communication between the ports in the closure plates 34 and 36 with the bores 16 and 18 through the rotor 10.

Since the arcuate opening 92 in the seal plate 60 is aligned and communicates with the high-pressure fluid discharge port 62 and conveys a fluid thereto under relatively high pressure, as will be hereinafter described, the opening 92 will be referred to as the high-pressure opening in the seal plate 60. Similarly, since the arcuate opening 94 is aligned and communicates with the low pressure fluid inlet port 54, the opening 94 will be referred to as the low pressure opening in the seal plate 60.

The seal plate 60 carries on one of its surfaces 96 a rib 100 which projects from this surface and extends around the edge of the arcuate, low pressure opening 94. The rib 100 retains, and lends mechanical strength to, a thin sheet 102 of material having a high shear strength and low coefficient of friction, and which is bonded to the face 96 of the seal plate 60 by a suitable adhesive. The sheet 102 preferably has a dynamic coefficient of friction in air of less than 0.20, a tensile strength at 73° F. of at least 6,000 p.s.i., and an ultimate elongation in tension at 73° F. of from about 4 percent to about 6 percent. A polyimide resin which is impregnated with graphite is very suitable. This material is sold under the trade name Vespel by the E. I. duPont de Nemours Company of Wilmington, Del. The sheet 102 is preferably bonded to the seal plate 60 with an epoxy resin. To further retain the sheet in position and enhance its shear strength, an annular rib 103 projects from the face 96 and extends around the outer perimeter of the sheet 102. The distance which the ribs 100 and 103 project from the face 96 of the seal plate 60 is less than the thickness of the sheet 102 so that the sheet forms a bearing and sealing surface contacting the end face 14 of the rotor 10 (see FIG. 1).

Figure 7:
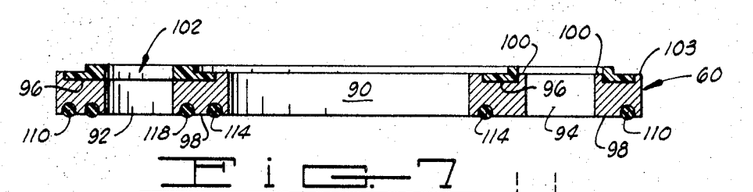
FIG. 7 is a sectional view taken along line 7-7 of FIG. 4.

The shape of the sheet 102 is best illustrated in FIGS. 6 and 7. It will be noted that the sheet 102 has an opening therein corresponding in size and geometry to the low pressure, arcuate opening 94 in the plate 60 and is aligned with this opening. The sheet 102 also has a second opening therein which is aligned with, and of equivalent configuration to, the arcuate, high-pressure opening 92 in the seal plate 60. The openings in the sheet 102 are separated by islands 104 and 106. These islands 104 and 106 each preferably have a width (as measured between openings 92 and 94) which is just slightly larger than the diameter of the openings of the rotor bores 16 and 18 in the end faces 19 and 21 of the wear plates 15 and 17.

On the surface 98 of the seal plate 60, an annular groove is provided which is located near the outer peripheral edge of the seal plate and receives an O-ring seal 110. A second annular groove is formed in the seal plate 60 around and adjacent the central opening 90 therethrough, and this groove receives an O-ring seal 114. A third groove is formed in the face 98 around the high-pressure opening 92 of the seal plate 60, and is of the same general configuration as the opening. This opening receives an O-ring seal 118 and it will be noted in referring to FIG. 4 that this O-ring seal encloses relatively large areas 120 and 122 adjacent the opposite ends of the opening 92 and on the opposite side of the seal plate from the islands 104 and 106. It will also be noted that relatively thin zones or areas 124 and 126 of the seal plate 60 are exposed radially inside of the O-ring seal 118 between it and the opening 92. In referring to FIG. 1 of the drawings, it will be noted that the O-ring seals 110, 114 and 118 bear against and sealingly engage the end face 58 of the closure plate 36.

The construction of the seal plate 60 and of the sealing elements which it carries are important features of the present invention. In certain applications of the seal structure of the invention, it is necessary that minimum power be employed to effect the relative movement between the opposed faces between which the seal structure is located. Thus, for example, when the energy exchange engine depicted in FIG. 1 is used in an exchange crystallization process for recovering fresh water from sea water, it is important that the power required to drive the rotor 10 in rotation be held to a minimum. The seal structures of the invention function to exert minimum drag or retarding forces on the rotor 10 while yet maintaining high integrity seals between the end faces 19 and 21 of the wear plates 15 and 17 and the closure plates 34 and 36.

Figure 2:
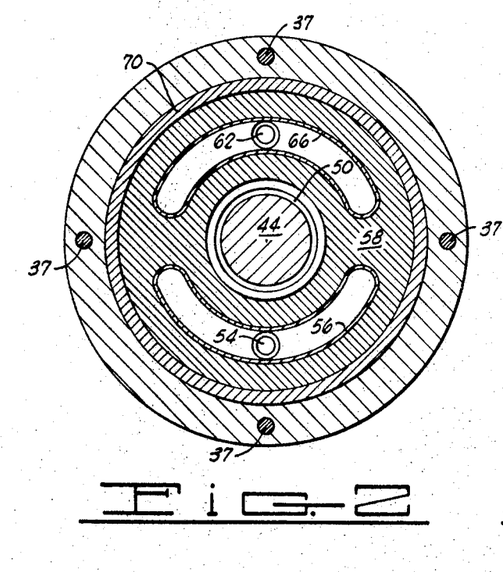
FIG. 2 is a sectional view taken along line 2-2 of FIG. 1.
Figure 3:
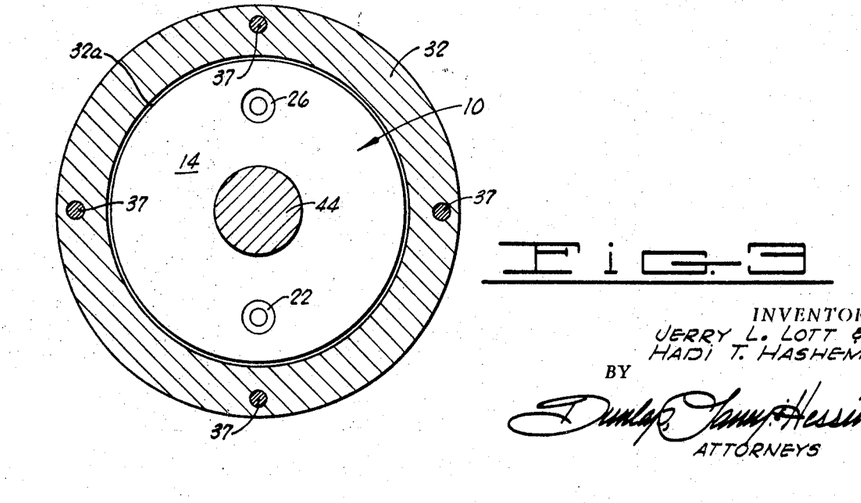
FIG. 3 is a sectional view taken along line 3-3 of FIG. 1.

In referring to FIGS. 1 and 2 of the drawings, it will be noted that the bores 16 and 18 in the rotor 10 and wear plates 15 and 17 are aligned with the arcuate high and low-pressure openings 92 and 94 in the seal plate 60 in the illustrated position of the rotor. As the rotor 10 is rotated, the openings at the end of each of the bores 16 and 18 sequentially move across the islands 104 and 106 of the sheet. Thus, at different times during each rotation of the rotor, two pressure statuses may be said to exist with respect to the forces due to fluid pressures which act on the seal plate.

Figure 8:
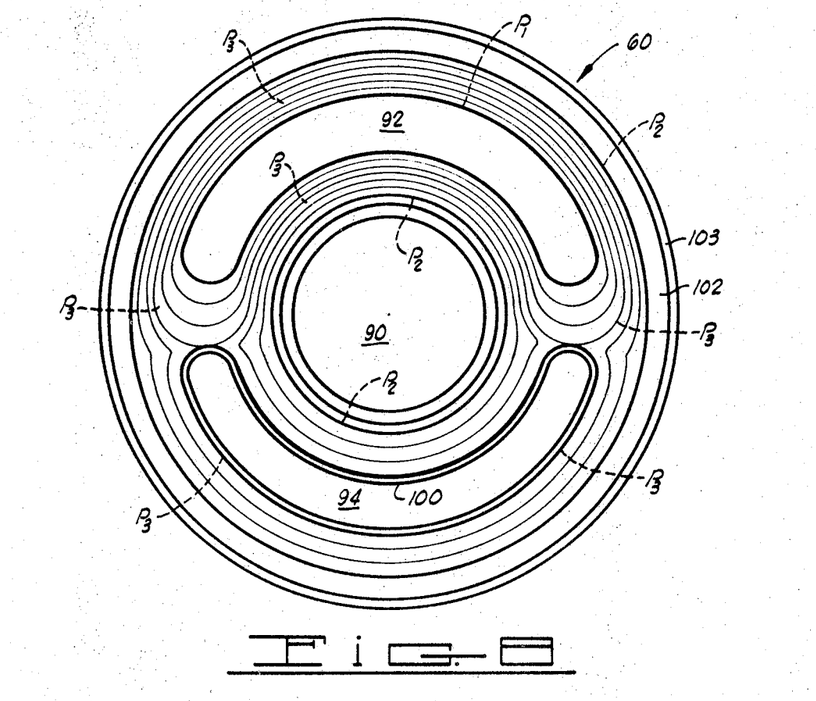
FIG. 8 is a diagrammatic illustration of the manner in which fluid pressure acts on the sealing element located on one side of the seal plate.

First, when the opening in one or more of the rotor bores 16 or 18 is at least partially aligned with one or more of the openings 92 or 94 through the seal plate 60, a fluid pressure gradient is established across the sheet 102 from the respective openings 92 and 94 outwardly therefrom in all directions, with the full system fluid pressure being exerted in a direction normal to the sheet 102 at its edge which is adjacent the respective opening in the seal plate 60. The disposition of the described pressure gradients extending outwardly from the high and low-pressure openings 92 and 94 at times when the bores 16 and 18 are aligned therewith is schematically illustrated in FIG. 8. In this diagram, lines of equal pressure (isobars) are shown on the face of the seal plate 60 which is covered by the sheet 102—that is, the pressure gradient acts across the monoplanar surface of the sheet. Adjacent the high-pressure port 92, the system pressure of the high-pressure fluid is arbitrarily designated $P_1$. Adjacent the low-pressure port 94, the system pressure of the low-pressure fluid is arbitrarily designated $P_3$. The extrinsic pressure, which in most uses of the seal will be atmospheric pressure, and which acts at the outer and inner edges of the raised bearing surface of the sheet 102 is arbitrarily designated $P_2$, and in the following discussions of the seal structure, is assumed to be less than $P_3$.

The pressure acting at any point on the sheet 102 acts normal to the surface of the sheet and gives rise to a force tending to bias or move the sheet away from the respective adjacent wear plate 19 or 21.

For purposes of analyzing the forces due to fluid pressure which act on the side of the seal plate 60 which carries the sheet 102, the pressure gradients around the high-pressure opening 92 and low-pressure opening 94 may be considered first as individual or isolated cases. Considering first and high-pressure port 92, an area $A_1$ of the sheet 102 surrounds this opening and lies inside of the isobar $P_3$. Over this area $A_1$, the pressure gradient extends from adjacent the opening 92 to $P_3$ at the outer boundary of the area. A force $F_1$ is exerted on the seal plate due to the effective fluid pressure acting on area $A_1$. This effective pressure can be approximated closely for a monoplanar sealing surface, such as that constituted by the sheet 102, as being one-half the difference between the highest pressure in the gradient, $P_1$, and the lowest pressure in the gradient, $P_3$. Thus, the force $$F_1 = \left(\frac{P_1 - P_3}{2}\right) A_1$$

where the parameters in the equation are defined as set forth above.

In addition to the force $F_1$ which acts to move the seal plate 60 away from the wear plate 21, an additional force $F_2$ acts to this end. This force $F_2$ is the force resulting from effective fluid pressure acting on the area of the surface of the sheet 102 which is outside the isobar $P_3$, or stated differently, the entire area of the monoplanar sealing and bearing area of the sheet 102 less the area $A_1$. The effective fluid pressure can again be approximated as being one-half the difference between the highest pressure in the pressure gradient acting across this $A_2$ area, i.e., $P_3$, and the lowest pressure in this pressure gradient, i.e., $P_2$. Thus, the force $$F_2 = \left(\frac{P_3 - P_2}{2}\right) A_2$$

The total force $F_t$ tending to move the seal plates away from their respective adjacent wear plates 19 or 21 is accordingly $F_1 + F_2$ or $$\left(\frac{P_1 - P_3}{2}\right) A_1 + \left(\frac{P_3 - P_2}{2}\right) A_2$$

In many uses of the seal structure of the invention, and particularly in the most frequent uses of the energy exchange engine depicted in FIG. 1, the pressure $P_3$ of the low pressure fluid passed through the low pressure openings 94 may be so low in comparison to the pressure $P_1$ of the high pressure fluid that the total pressure $F_t$ acting on the sheet 102 may be considered to be essentially $$\left(\frac{P_1 - P_3}{2}\right) A_1$$

Under the same operating conditions, that is, when the rotor bores 16 and 18 are aligned with the high- and low-pressure openings, 92 and 94, respectively, in the seal plates, a force $F_T$ acts upon the opposite side 98 of each seal plate as a result of fluid pressure applied to such opposite side. This force $F_T$ acts in opposition to the force $F_t$ described above as acting on the sheet 102. Like the force $F_t$, the force $F_T$ can be resolved into component forces acting against high-pressure and low-pressure areas. Thus, a force $F_3$ acts against the area $A_3$ of the surface 98 which is enclosed within the O-ring seal 118, hereinafter termed the high-pressure O-ring seal, and is equal to the pressure $P_1$ of the high-pressure fluid multiplied by this area, i.e., $F_3 = P_1 A_3$. Similarly, a force $F_4$ acts against the area $A_4$ of the surface 98, with this area being defined as that located between the low-pressure O-ring seals 110 and 114 and outside of the high-pressure O-ring seal 118. This force $F_4$ is equal to the pressure of the low-pressure fluid $P_3$ multiplied by the area $A_4$. In summary then, $F_T = F_3 + F_4 = P_1 A_4$, and $F_4$ may be ignored in uses where $P_3$ is very small in comparison to $P_1$ as previously described.

When the forces $F_t$ and $F_T$ are equal, no net force is developed across the seal plate 60 tending to move it in either direction. In this case, there will therefore be no force (due to fluid pressure and neglecting the bias exerted by the O-ring seals 110, 114 and 118 in compression) acting to force the sheet 102 into sealing contact with the face 14 of the rotor 10, and leakage can occur. It is therefore apparent that for sealing to occur at this interface, a positive net force must act across the seal plate 60 toward the rotor 10 to force the sheet 102 into sealing contact with the face 21 of the plate 17. If fluid pressure is to be solely relied upon to provide this net force, it is apparent that $F_T$ must be greater than $F_t$, and since the parameters $P_1$, $P_2$ and $P_3$ are fixed and known, the areas $A_1$, $A_2$, $A_3$ and $A_4$ are the parameters which must be selectively controlled in order for the desired net force to obtain.

In addition to the primary requisite of making $F_T$ greater than $F_t$ in order to prevent leakage across the sheet 102, it is desirable in many usages of the seal structure of the invention to make the amount by which $F_T$ exceeds $F_t$ minimal. This is because the greater the force driving the sheet 102 carried by the seal plate 60 against the planar end face 21 of the wear plate 17, the greater is the power requirement for driving the rotor in rotation. Such power requirement is an extremely important consideration in such usages of the energy exchange engine as in the recovery of relatively pure water from saline solutions by the process of exchange crystallization. In summary then, the optimum construction of the seal structure, considering only the status or condition when the opening in the rotor bores 16 or 18 are aligned with the high-pressure opening 92 through the seal plate 60, is such that the net force, $F_n$, $(F_T - F_t)$ is positive and minimal. Thus, $$F_n = F_T - F_t = P_1 A_3 + P_3 A_4$$
$$- \left(\frac{P_1 - P_3}{2}\right) A_1 - \left(\frac{P_3 - P_2}{2}\right) A_2 > 0 \quad (1)$$

where $F_n$ equals the net force acting against the seal plate 60 tending to move it toward the rotor 10 and $P_1, P_2, P_3, A_1, A_2, A_3$ and $A_4$ have the values hereinbefore defined. Again, when the pressure $P_3$ of the low-pressure fluid is very small in comparison to the pressure $P_1$ of the high-pressure fluid, the expression may, for practical purposes, be reduced to $$F_n = F_T - F_t = P_1 A_3 - \frac{P_1 A_1}{2} > 0 \quad (2)$$

Since a specific object of the invention is to provide a face seal structure which provides an effective fluid seal between two parallel, monoplanar faces, while offering minimum resistance to the movement of one of the faces relative to the other, it is obviously desirable to minimize the sealing and bearing surface of the sheet 102. Once the point in the pressure gradient $P_3 - P_2$ is reached where the minimum pressure ($P_2$) isobar in the gradient is as low as the extrinsic pressure, it is obviously undesirable to extend the sealing and bearing surface of the sheet outwardly past this isobar. It will also be noted in referring to equation (2) above that where $P_3$ is low compared to $P_1$, the constant system pressure $P_1$ may be cancelled from the equation so that it may be seen that for $F_n$ to be infinitesimally greater than 0, the area $A_1$ of the sheet 102 (around the high-pressure opening 92) is optimally slightly less than twice the area $A_3$, which is the area inside the high-pressure O-ring seal 118.

Where $P_3$ is a significant pressure in relation to $P_1$, then the design of the seal structure must be based on the initial mapping of the $P_3$ isobar in the sheet 102 in order to derive from this the proper location of the O-ring seals on the surface 98 so as to correlate the areas $A_3$ and $A_4$ properly to the areas $A_1$ and $A_2$.

The foregoing discussion has been directed to the considerations dictating seal structure design when the condition exists that ports are aligned through the opening 92 and 94 in the seal plate 60 for transferring a pressurized fluid therethrough. A differing situation exists, however, at another time during rotation of the rotor 10 relative to the seal plates which are, of course, keyed to the respective closure plates. At this time, the opening of one of the bores 16 or 18 in the wear plate 21 passes across one of the islands 104 or 106 of the sheet 102 from the high-pressure opening, carrying high-pressure fluid as it does so. The opening of the other bore passes across the island 104 or 106 on the opposite side of the sheet 102 carrying the low-pressure fluid at pressure $P_3$.

Figure 9:
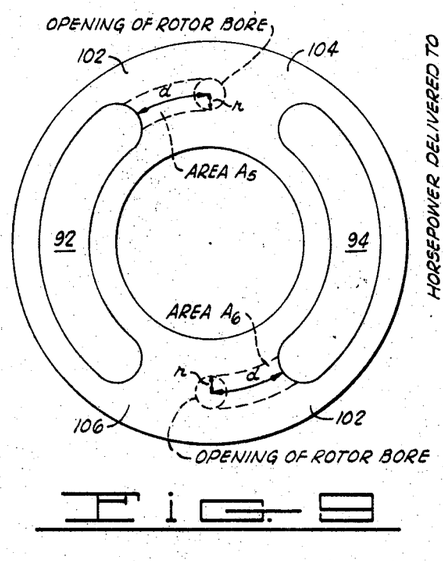
FIG. 9 is a diagrammatic illustration showing the areas of the seal plate against which certain pressures act during one operating status of the seal structure of the invention.

When this condition occurs, the full fluid pressure $P_1$ of the high-pressure fluid acts upon an area $A_5$ of the sheet 102 which includes the zone directly under or in line with the opening at the end of the respective bore 16 or 18 of the rotor 10 (and is thus also the cross-sectional area of this bore opening), and also includes the area of the sheet 102 which has been swept out by the bore opening as it has moved across the sheet from the high-pressure opening 92. This area $A_5$ is depicted in the diagram illustrated in FIG. 9, and may be seen to be equivalent to approximately $$\frac{\pi r^2}{2} + 2rd$$

where $r$ is the radius of the opening of the bore moving across the island and $d$ is the distance from the center of the opening to the nearest adjacent edge of the high-pressure opening 92. Thus, the seal plates are here subjected to a force $F_5 = P_1 A_5$ tending to bias the seal plates away from the rotor 10 and from the wear plates 19 and 21 carried thereby.

The same situation exists over an area $A_6$, which is the area aligned with the opening of the bore 16 or 18 carrying low-pressure fluid (at pressure $P_3$) and between this area and the low-pressure opening. The force $F_6$ acting on this area is equal to the area $A_6$ multiplied by the pressure $P_3$ of the low-pressure fluid.

Outside of the areas $A_5$ and $A_6$ in which the pressures $P_1$ and $P_3$ are exerted, the pressure gradients heretofore described are effective. Thus, there is the area inside the $P_3$ isobar and outside the areas $A_5$ and $A_6$ against which the pressure gradient $P_1 - A_3$ acts. This area is essentially the same as the area $A_1$, previously described, except for its noninclusion of the areas $A_5$ and $A_6$. Stated differently, this area over which the pressure gradient $P_1 - P_3$ acts is equal to $A_1 - A_5 - A_6$ and the force $F_7$ acting on this area is equivalent to $$\frac{P_1 - P_3}{2}(A_1 - A_5 - A_6)$$

To the outside of the $P_3$ isobar, an area of the sheet 102 exists which is subjected to a pressure gradient $P_3 - P_2$. For most purposes, this area can be considered to be substantially equivalent to the area $A_2$ hereinbefore described. The force $F_8$ acting on this area at this time can thus be expressed as $$F_8 = \left(\frac{P_3 - P_2}{2}\right) A_2$$

From the foregoing considerations, it will be seen that the total force $F_t$ acting against the respective seal plates on the sides thereof which carry the sheet 102 at a time when the openings at the ends of the bore 16 and 18 pass over the islands 104 and 106 may be expressed $$F_t = F_5 + F_6 + F_7 + F_8$$
$$= P_1 A_5 + P_3 A_6 + \frac{P_1 - P_3}{2}(A_1 - A_5 - A_6) + A_2\left(\frac{P_3 - P_2}{2}\right)$$
(3)

In referring to equation (3), it will be observed that when $P_3$ is very small in comparison to $P_1$, the equation may be simplified, i.e., $$F_t = P_1 A_5 + \frac{P_1}{2}(A_1 - A_5 - A_6)$$

It will also be noted in comparing the values of the total forces $F_t$ for the two statuses of the rotor bores relative to the openings 92 and 94 and the islands 104 and 106 as discussed above, that $F_t$ is always greater when the bore openings are aligned with the islands 104 and 106. That is, a greater force acts to move the seal plates away from their respective wear plates when the openings of the bores 16 and 18 are passing across the islands 104 and 106 than when these bore openings are aligned with the openings 92 and 94 in the seal plates. Moreover, this is true whether the force due to the pressure $P_3$ exerted by the low-pressure fluid is neglected or taken into account.

At the time that the openings at the ends of the bores 16 and 18 pass across the islands 104 and 106 of the sheet 102, a force $F_T$ opposing the force $F_t$ is acting on the opposite side of the respective seal plate due to the pressures exerted thereon by the high- and low-pressure fluids. As previously described, this force $F_T$ is equal to the sum of the component forces $F_9$, acting on an area of the surface 98 located within the high-pressure O-ring seal 118, and $F_{10}$ acting on an area located between the low-pressure O-ring seals 110 and 114 and outside of the high-pressure O-ring seal 118.

As will be apparent from the foregoing discussion, in order for the seal plate 60 and 86 to be biased into sealing contact with the adjacent respective wear plates 19 and 21, $F_T$ must be greater than $F_t$, and in order for the power required to drive the rotor in rotation to be minimized, it is necessary that $F_T$ be only infinitesimally greater than $F_t$. It follows from this and what has previously been said that $F_T$ for the condition of bore-island alignment must be greater than $F_T$ when the bores 16 and 18 are aligned with the openings 92 and 94, since at the former time $F_t$ has been shown to be greater than $F_t$ when the latter status obtains, i.e., a greater force acts against each seal plate tending to bias it away from the rotor 10 at those times when the bore openings are transiting the islands 104 and 106 of the sheet 102 than when they are aligned with the high- and low-pressure openings 92 and 94. Since $P_1$ and $P_3$ are substantially constant during operation of the device, it then follows that the areas enclosed by the O-ring seals 110, 114 and 118 must be greater than would be dictated only by the condition in which the bore openings are aligned with the high- and low-pressure openings 92 and 94 in the seal plates. In other words, all areas of the seal structure against which fluid pressure acts during operation of the energy exchange engine are designed for the condition in which the bore openings are passing across the islands 104 and 106. In order to obtain the necessary small net force $F_n$ across the seal plates 60 and 86 toward the rotor 10 at this time, it is necessary that $$F_n = F_T - F_t$$
$$= P_1 A_3 + P_3 A_4$$
$$- \left[P_1 A_5 + P_3 A_6 + \frac{P_1 - P_3}{2}(A_1 - A_5 - A_6)\right.$$
$$\left. + \left(\frac{P_3 - P_2}{2}\right)A_2\right]$$

Again, where $P_3$ is very small in relation to $P_1$, the equation may be simplified to $$F_n = P_1 A_3 - P_1 A_5 - \frac{P_1}{2}(A_1 - A_5 - A_6)$$

Thus, for $F_n$ to be the required infinitesimally small positive value, it is necessary for $A_3$, the area within the high-pressure O-ring seal 118, to be infinitesimally greater than the sum $$A_5 + \left(\frac{A_1 - A_5 - A_6}{2}\right)$$

since the system pressure $P_1$ is a constant value.

Where $P_3$ is significantly large in relation to $P_1$, the $P_3$ isobar must be mapped in the sheet 102 to permit the several areas described to be properly identified and the size of the bearing surface of the sheet 102 and the position of the O-ring seals 110, 114 and 118 to be determined accordingly.

As suggested by the foregoing discussion, the net force $F_n$ acting across the seal plates toward the rotor will fluctuate from a minimum value when the rotor bores are aligned with the islands 104 and 106 to a maximum value when the rotor bores are aligned with the high- and low-pressure openings 92 and 94, respectively, in the respective seal plates. Since none of the areas can be changed once established, it is therefore only possible to construct the seal structure so that these areas yield the smallest possible net force tending to move the seal plate against the rotor when the rotor bore openings are passing across the islands 104 and 106. During the other condition obtaining during operation, the bore openings are aligned with the seal plate openings 92 and 94, this net force will increase due to the decrease in the force acting across the seal plate 60 in the direction away from the rotor 10. This increase in the net force acting across the seal plates at this time increases the power requirement necessary to rotate the rotor, and for this reason is desirably kept to a minimum. If the areas $A_5$ and $A_6$ are reduced in size, this will have the effect of reducing the difference between the net forces which act across the seal plates at times when the two different pressure conditions obtain. Reference to FIG. 9 of the drawings will suggest that reduction of these areas may be accomplished by reducing the width of the islands between the openings 92 and 94 to an optimum width of just slightly greater than the diameter of the bore openings which must pass thereacross. Areas $A_5$ and $A_6$ can also be reduced in size by reducing the cross-sectional area of the bore openings themselves. This approach to equalization of the net forces acting across the seal plates during the two operating conditions has the adverse effect, however, of reducing the capacity of the device in terms of fluid transfer per unit of time.

It should be pointed out that other sealing elements other than the O-ring seals 110, 114 and 118 may be utilized on the side of the seal plate 60 where these seals are positioned, or O-ring seals could be used on differently configured seal plates at a location other than on the surface actually acted on by fluid pressures tending to bias the seal plates toward the rotor. With whatever type of sealing element is used, however, the total area of the surface 98 of the seal plate 60 upon which the pressures $P_1$ and $P_3$ act should be selected so that a minimum positive force acts upon the seal plate 60 to hold it against the rotor 10 at the time when the bore openings are crossing the islands 104 and 106. It may further here be noted that in the illustrated embodiment of the seal structure of the invention, the O-ring seals 110, 114 and 118 act as energizers or biasing elements which establish a static seal between the sheet 102 and the respective adjacent wear plates 15 and 17 at the time immediately preceding startup of the rotor. In other words, prior to rotation of the rotor and the transfer of high- and low-pressure fluids from the rotor through the seal plates 60 and 86, the fluid pressure forces relied on to establish the minimal net force heretofore described have not commenced to act, and some type of biasing element, such as the O-ring seals, are needed to effect a static seal between the wear plates and seal plates and prevent fluid leakage. It should be pointed out that springs located between the seal plates 60 and 86 and the respective closure plates 34 and 36, or other biasing elements, could be employed for this purpose in place of the O-ring seals in other embodiments.

Figure 10:
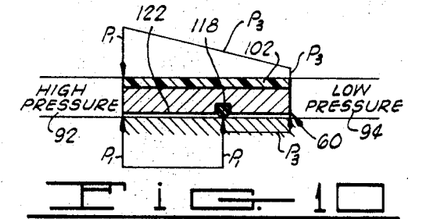
FIG. 10 is a force diagram illustrating the manner in which forces due to fluid pressure act on a portion of the seal plate at a time when the ports located in the faces between which the seal structure of the invention is located are aligned with an opening through the seal plate.
Figure 11:
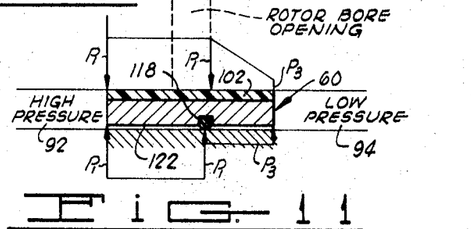
FIG. 11 is a force diagram illustrating the manner in which forces due to fluid pressure act on a portion of the seal plate at a time when ports located in the faces between which the seal structure of the invention is located are passing across at least a portion of the seal plate which contains no opening therethrough.

It is important to note concerning the construction of the seal plates 60 and 86 that the total area of the surface 98 which is within the O-ring seal 118 includes the relatively large areas 120 and 122 which are directly opposed to the islands 104 and 106 on the opposite side of the seal plate 60 therefrom. Thus, the locus at which the greatest increment of the total force acting on the sheet 102 is brought to bear during the rotation of the rotor 10 is made to be exactly opposite the locus on the other side of the plate at which the greatest increment of opposing force is acting. Thus, a localized near balancing of forces is achieved so that warping, bending or distortion of the seal plate is avoided. FIGS. 9 and 10 schematically illustrate the manner in which the pressures $P_1$ and $P_3$ act on the seal plate across the areas of the islands 104 and 106. FIG. 9 depicts the condition when the rotor bores are aligned with the openings in the seal plate. FIG. 10 depicts the condition when a rotor bore passes across one of the islands.

OPERATION

The operation of an engine of the type depicted in FIG. 1 for exchanging energy between high- and low-pressure systems is explained in detail in copending application for U.S. Letters Pat. Ser. No. 598,423. However, such description of operation will be briefly repeated here, with reference being particularly made to the role of the seal structure of the present invention in the operation of such engine. In the operation of the energy exchange engine, two process liquids which may be denominated liquid A and liquid B are available in an industrial process, such as the exchange crystallization process for recovering fresh water from sea water, with liquids A and B (which may be slurries) being present at pressures $P_3$ and $P_1$, respectively. The pressure $P_1$ of the liquid B is substantially greater than the pressure $P_3$ of the liquid A.

The liquid A at pressure $P_3$ is directed through the low-pressure fluid inlet conduit 55 to the low-pressure fluid inlet passageway or port 54 in the closure plate 36 of the engine. The port or passageway 72 through the closure plate 34 is connected to a relatively low-pressure zone which will be, in most instances, at atmospheric pressure. The high-pressure inlet conduit 79 is connected to a source of the high-pressure liquid B at pressure $P_1$, and this liquid is directed at this pressure into the high-pressure inlet passageway or port 78. The high-pressure discharge port 62 and the high-pressure discharge conduit 64 which communicates therewith are connected to some suitable fluid-confining means which can retain a fluid under pressure, and can receive fluid under pressure pumped thereinto from the high-pressure fluid discharge port 62.

When the depicted energy exchange engine is thus connected to the high-pressure and low-pressure fluids B and A, respectively, and to the confining means and to an atmospheric vent as described, the energy exchange engine can be utilized for efficiently transferring a substantial portion of the total pressure energy from the high-pressure liquid B to the relatively lower pressure liquid A. Under these conditions, where $P_1$ is above, say, 500 p.s.i., the effect of the low-pressure liquid A in the determination of the forces acting on the seal plates 60 and 86 can be ignored in designing the seal plates according to the criteria hereinbefore discussed. Having set the rotor 10 in rotational motion by energizing a motor or other suitable prime mover connected to the drive shaft 44, the axial bores 16 and 18 formed in the rotor, and in the wear plates 19 and 21, are, in consecutive sequence, brought into axial alignment with the arcuate high- and low-pressure openings 92 and 94 in the seal plate 60 and are also, in consecutive sequence, brought into axial alignment with the high- and low-pressure openings 92 and 94 in the seal plate 86. It will be noted in referring to FIG. 1 that, in the illustrated status of the energy exchange engine, the low-pressure opening 94 in the seal plate 60 is aligned with the bore 16 in the rotor 10 and wear plate 17 while this bore is aligned at its other end (through the wear plate 15) with the low-pressure arcuate opening 94 in the seal plate 86. At the same time, the bore 18 in the rotor 10 and wear plates 15 and 17 is aligned with the arcuate high-pressure openings 92 in each of the seal plates 60 and 86. At this time during the operation of the engine, the relatively low-pressure liquid A at pressure $P_3$ enters the port 54 in the closure plate 36, and from this port passes through the low-pressure arcuate opening 94 in the seal plate 60. From this opening, the low-pressure liquid A enters the bore 16 of the rotor 10 via the wear plate 17. Leakage between the seal plate 60 and the wear plate 17 is prevented by the sheet 102 of low coefficient of friction, high shear strength material as hereinbefore described. Leakage of the low-pressure fluid between the seal plate 60 and the face 58 of the closure plate 36 is prevented by the O-ring seal 110. Leakage between the seal plate 60 and the drive shaft 44 of the rotor is prevented by the O-ring seal 114. The seal plate 60, and more specifically, the sheet 102 carried on the face thereof adjacent the wear plate 17 is held in sealing contact with the face 21 of the wear plate by the net force acting across the seal plate due to the action of the high-pressure fluid passing through the seal plate high-pressure arcuate opening 92 from the bore 18 in a manner to be hereinafter described.

At the same time that the low-pressure liquid A enters the bore 16 of the rotor 10, some of liquid B which has been previously entrapped in the part of the bore 16 to the left of the ball 28 is placed in communication with the vent or low-pressure environment, and can be discharged through the low-pressure arcuate opening 94 in the seal plate 86 and through the low-pressure discharge port 72 which communicates with the low-pressure discharge conduit 76. This occurs, of course, as the ball 28 is displaced to the left in the bore 16 by the impress of the relatively low-pressure fluid A entering the right side of this bore.

At this time, in the case of the axially extending bore 18 of the rotor 10, relatively high-pressure liquid B at pressure $P_1$ is entering the left side of this bore via the high-pressure fluid inlet conduit 79, the high-pressure fluid inlet port 78 and the high-pressure arcuate opening 92 in the seal plate 86. As the high-pressure liquid B at pressure $P_1$ passes through the seal plate 86, the fluid pressures acting on the exposed areas on opposite sides of the seal plate 86 set up or create the forces $F_t$ and $F_T$ hereinbefore described. At this time, however, as explained previously in the description of the method, a high net force results from these acting fluid pressures which forces the seal plate 86 toward the end face 19 of the wear plate 21 so that a liquid tight seal is formed by the sheet 102 in contact with this end face of the wear plate. Simultaneously, leakage around the seal plate 86 from the arcuate high-pressure opening 92 is prevented by the seal established between the O-ring seal 118 and the seal plate 86 on one side, and between this O-ring seal and the opposing face of the closure plate 34 on the other side.

As the high-pressure liquid B at pressure $P_1$ enters the left side of the bore 18, the ball 30 is driven toward the right. This displaces the entrapped liquid A which is disposed in the right side of the bore 18 as a result of its entry into this bore at a previous time when the bore 18 occupied the position shown as occupied by the bore 16 in FIG. 1, and as described as occurring in the case of the bore 16 when in the position shown. This occurred, of course, at a time earlier in the rotational movement of the rotor 10. Continued impress of the high-pressure liquid B upon the left side of the ball 30 eventually drives the ball to the right side of the bore 18 and completely displaces the relatively low-pressure fluid A from this bore at a pressure which is only slightly less than that of the high-pressure fluid B. It will be recalled that the liquid A from the bore 18 is being discharged into a confining space able to contain the liquid A at a superatmospheric pressure. Thus, the liquid A is being discharged through the high-pressure arcuate opening 92 of the seal plate 60 at a relatively high-pressure, and the balancing of fluid pressure generated forces in the manner hereinbefore described occurs. Due to the fact that the status of the rotor and seal plate is such that the bore 18 is aligned with the high-pressure arcuate opening 92 at this time, a relatively high net force $F_n$ acts across the seal plate 60 to bias the seal plate toward the rotor 10, and force the sheet 102 into firm sealing contact with the end face 21 of the wear plate 17. It is during these periods when the bores 16 and 18 are aligned with their respective low-pressure and high-pressure openings in the seal plates 60 and 86 that the greatest drag or frictional resistance to rotation is exerted on the rotor 10. Nevertheless, it is desirable to have the openings 92 and 94 cover a large portion of the total arcuate circumference of the faces of the seal plates 60 and 86 since this permits a greater period of "dwell" and turnaround time for the balls 28 and 30 within their respective bores 16 and 18, and the exchange engine functions more efficiently.

As the rotor 10 continues to rotate, the bores 16 and 18 move out of alignment with the respective high-pressure arcuate openings 92 and low-pressure arcuate openings 94. In so doing, the bores 16 and 18 move across the islands 104 and 106 of the sheet 102. The bores 16 and 18 thus move into alignment or registry with the islands 104 and 106, and there occurs a sudden or very rapid increase in the total force acting on the seal plates 60 and 86 tending to drive them away from the end faces of the rotor, and there is a localized concentration of this increased force at the location of the islands. To counteract this increase in force acting across the seal plates 60 and 86 at this time, the high-pressure O-ring seal 118 on each of the seal plates 60 and 86 is extended beyond the end of the high-pressure arcuate opening 92 so that the system pressure continues during this time to act on the areas 120 and 122 within the high-pressure O-ring seals 118, and at each end of the high-pressure arcuate openings 92 of each seal plate. Thus, there is an opposing or "supporting" force exerted at these two locations on the faces 98 of each seal plate 60 and 86 tending to counteract or oppose the force brought to bear on the islands 104 and 106 as the bores 16 and 18 move thereacross. The islands 104 and 106 are made only wide enough to assure that there will be a complete cutoff of fluid transfer from the bores 16 and 18 through the openings in the seal plate as a reversal in the direction of the pressure differential occurs when the bores move sequentially from a high-pressure registration at any specific end thereof to a low-pressure registration.

As an example illustrative of the value of an energy exchange engine utilizing the seal structures of the present invention, consider first such an exchange engine having a liquid throughput capacity of 17 gallons per minute. Such an exchange engine would deliver this capacity if, for example, it had a rotor containing 14 axially extending, ½-inch diameter bores, a piston or ball travel of 24 inches and seals which have been tested and used in the laboratory as hereinafter described. The engine would be driven at 60 r.p.m. by a suitable motor of relatively high efficiency. The operating pressures of the process (that is, of liquid B at pressure $P_1$) in which the engine is being used might typically be 2,800 p.s.i. In this process, a liquid A must be raised from, say, 20 p.s.i. ($P_3$) to 2,800 p.s.i. so that it can be processed. After completion of the process step or steps, the liquid B at 2,800 p.s.i. $P_1$ is to be depressurized to 20 p.s.i. for additional processing or storage.

The theoretical horsepower required to pressurize the liquid A from 20 p.s.i. to 2,800 p.s.i. is $$H.P. = V \Delta P / 33,000$$

where H.P. is horsepower, $V$ is volumetric flow rate in cubic ft/min. and $\Delta P$ is the pressure difference in p.s.f. Substituting 17 g.p.m. for $V$ and 2,780 p.s.i. for $\Delta P$, and converting to the appropriate units, one obtains $$H.P. = \left(\frac{17 \text{ gal.}}{\text{min.}}\right) \left(\frac{\text{ft.}^3}{7.48 \text{ gal.}}\right) \left(\frac{2,780 \text{ lb.}}{\text{in.}^2}\right) \left(\frac{144 \text{ in.}^2}{\text{ft.}^2}\right)$$

$$/ 33,000 \frac{\text{ft. lb.}}{\frac{\text{min.}}{\text{H.P.}}}$$

$$= 27.5 \text{ horsepower}$$

Figure 12:
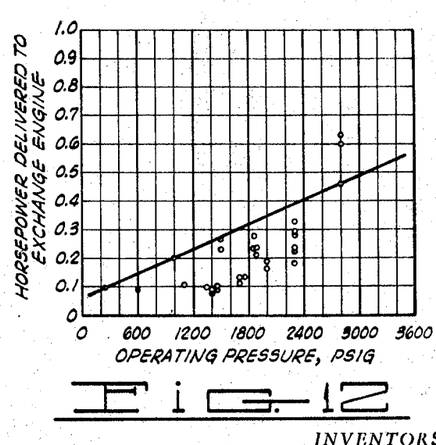
FIG. 12 is a graph depicting the manner in which the high-pressure fluid operating pressure acting in an exchange engine of the type depicted in FIG. 1 is related to the horsepower required to drive the rotor of the engine.

The actual measured horsepower required to drive an exchange engine (incorporating the seal structures of this invention) as a function of pressure is shown in FIG. 12. The actual data points as measured in the laboratory are shown as circles. The highest points (in terms of horsepower requirement) were obtained with new seals; lower points were obtained for seals which have been worn in. The line in FIG. 12 therefore represents a conservative, or upper, limit for power consumption that would be expected over the life of a seal structure. Thus, at 2,800 p.s.i. pressure of the high-pressure liquid B, the power required to drive the exchange engine would be 0.46 horsepower.

Additional energy losses occurring in the engine include the pressure differentials required to move the pistons or balls in the bores of the rotor. Laboratory tests have shown that a differential of 6 p.s.i. is sufficient to move the pistons or balls.

Since a differential of 6 p.s.i. is required in each direction, the total energy loss is 12 p.s.i. The theoretical horsepower required to overcome this pressure differential is $$H.P. = \left(\frac{17 \text{ gal.}}{\text{min.}}\right)\left(\frac{\text{ft.}^3}{7.48 \text{ gal.}}\right)\left(\frac{12 \text{ lb.}}{\text{in.}^2}\right)\left(\frac{144 \text{ in.}}{\text{ft.}^2}\right) / 33,000 \text{ ft.} - \text{lb./min./H.P.}$$
$$= 0.12 \text{ horsepower}$$

Thus, the total theoretical horsepower required to operate the engine is 0.58 horsepower. If the conversion of electrical energy to mechanical energy is 75 percent, then the total actual horsepower required to operate the engine is 0.774 horsepower.

The energy recovered by the engine is thus the difference between the energy required to pressurize the fluid from 20 p.s.i. to 2,800 p.s.i. and the actual energy required to operate the engine. Thus, the energy recovered in terms of horsepower is $$\text{Horsepower recovered} = 27.5 - 0.774$$
$$= 26.726 \text{ horsepower}$$

Therefore, the efficiency of the engine is $$\text{Efficiency} = \frac{26.726}{27.5}(100) = 97.2\%$$

The above calculations have been based on the assumption that the liquid being pressurized is incompressible. However, most liquids are slightly compressible to the extent of about 1 percent for the above pressure level. This compressibility of the liquid is an additional loss of energy which cannot be recovered in the energy exchange engine. Therefore, the decrease in the efficiency of the engine will be about 1 percent.

The leakage of the seals considered in this illustration has been measured in the laboratory. The leakage can be divided into two quantities: (1) the external leakage across the seal to the inside or outside of the rotor and (2) the internal leakage across the islands of the seal from the high-pressure port to the low-pressure port. The external leakage is too small to measure. The internal leakage measured experimentally is about 11 ml. per minute. Comparing the internal leakage with the energy exchange engine flow rate, it is seen that the internal leakage is negligible and does not need to be considered in the above calculations. The efficiency of the energy exchange engine using the seal structure disclosed is thus greater than 95 percent.

From the foregoing description of the invention, it is believed that it will be perceived that the seal structure of the present invention provides an improved and highly effective face seal which can be employed successfully and over extended periods of time between planar ported faces which are moved relatively to each other.

What we claim is:

1. In combination with two relatively moving solid bodies having substantially parallel, planar faces having ports therein which periodically communicate during such relative movement, and are periodically out of communication, a face seal structure positioned between the solid bodies and comprising:
    a seal plate having opposed, parallel, planar surfaces and having an opening therethrough positioned for periodic registry with both said ports in said faces, and periodic nonregistration with one of said ports;
    means keying the seal plate to one of the bodies for movement therewith relative to the other body, and for registration of said opening with the port in the face carried by said one body;
    a first sealing element of low coefficient of friction, high shear strength material secured to said seal plate around said opening and having a monoplanar bearing surface sealingly contacting the face of said other body; and
    a second sealing element on the opposite side of said seal plate from said first sealing element and sealingly positioned between said one body and said seal plate at a lo- 2. The combination defined in claim 1 wherein said first sealing element comprises a polyimide resin.

3. The combination defined in claim 1 wherein said second sealing element comprises an elastomeric O-ring seal secured to said opposite side of the seal plate around said opening.

4. The combination defined in claim 3 wherein said O-ring seal encloses an area of one of the planar surfaces of said seal plate which is on the opposite side of said seal plate from a portion of the opposite surface thereof across which one of said ports passes as said bodies and the faces carried thereby move relative to each other.

5. A face seal structure for sealing between relatively moving parallel planar faces having two fluid-conveying ports periodically in the faces which periodically communicate, said face seal structure comprising:
    a seal plate having two opposed, parallel, planar surfaces, and having at least one opening therethrough through which said ports periodically communicate with each other;
    a first sealing element configured as a flat sheet bonded to one of said planar surfaces around said opening and having a dynamic coefficient of friction in air of less than 0.20, a tensile strength at 73° F. of at least 6,000 p.s.i., and an ultimate elongation in tension at 73° F. of from about 4 percent to about 6 percent; and
    a second sealing element around said opening on the opposite side of said sealing plate from said first sealing element; and
    means for keying said seal plate to one of said faces for movement therewith relative to the other face with said one surface of said sealing plate extending parallel to said one face and positioned on the opposite side of said seal plate from said one face.

6. A face seal structure as defined in claim 5 wherein said seal plate opening is arcuate and extends along a portion of the circumference of a circle.

7. A face seal structure as defined in claim 5 and further characterized to include a rib retaining said first sealing element against sliding movement on said one surface.

8. A face seal structure as defined in claim 5 wherein said first sealing element is a graphite impregnated polyimide resin.

9. A face seal structure as defined in claim 5 wherein said second sealing element is an elastomeric O-ring seal.

10. A face seal structure as defined in claim 5 wherein said first sealing element is characterized in having a flat, exposed sealing and bearing surface extending parallel to said one surface and surrounding said opening; and
    wherein said second sealing element extends around and seals off an area on the planar surface of said seal plate opposite the planar surface to which said first sealing element is bonded, said area being such that a fluid pressure acting thereon as said faces move relative to each other to communicate said ports through said opening will force said plate away from said one face toward the other face at all times during said relative movement whereby said flat sealing and bearing surface is forced into sealing engagement with said other face.

11. A face seal structure as defined in claim 6 wherein said seal plate contains a pair of said arcuate openings both located on a common circle and having their ends spaced from each other; and
    wherein said second sealing element extends around and seals off an area on the planar surface of said seal plate opposite the planar surface to which said first sealing element is bonded, said area including portions of the planar surface on which it is located which are disposed between said arcuate openings.

12. A face seal structure as defined in claim 11 wherein said first sealing element is characterized in having a flat, exposed sealing and bearing surface extending parallel to said one surface and surrounding said opening; and
    wherein said second sealing element is an elastomeric O-ring seal mounted on said seal plate, the area surrounded and sealed off by said O-ring seal being such in relation to cation surrounding said opening, said first and second sealing elements being configured to limit the areas upon which fluid pressure acts on the opposite sides of said sealing plate to minimize the net positive force due to fluid pressure acting to force said planar bearing surface against the face of said other body when the port in the face of said other body is not aligned with said opening.

the area of said sealing and bearing surface that a fluid pressure acting thereon from the ports in said faces as said faces move relative to each other will force said plate away from said one face toward the other face at all times during said relative movement whereby said flat sealing and bearing surface is forced into sealing engagement with said other face.

13. A face seal structure for securement to one ported planar surface which is held stationary as a second, parallel, ported planar surface is rotated about an axis extending normal to both planar surfaces to periodically bring the port therein into alignment with the port in said first mentioned planar surface, said face seal structure comprising:
 a disc-shaped seal plate having opposed, parallel, planar sides and having an opening therethrough through which the ports in said planar surfaces can periodically communicate with each other as said second planar surface is rotated;
 a sheet of polyimide resin bonded to one of the planar sides of said seal plate and having an exposed flat surface extending parallel to the planar side of the seal plate to which it is bonded, and surrounding said opening in the seal plate; and
 an O-ring seal secured to, and sealingly engaging, the second planar side of the seal plate opposite the side thereof bonded to said sheet of polyimide resin, said O-ring seal surrounding said opening and projecting away from said seal plate in a direction normal to the planar sides thereof.

14. A face seal structure as defined in claim 13 wherein the area of said flat surface is between one and two times the area of that portion of said second planar side of the seal plate which is enclosed within said O-ring seal.

15. A face seal structure for sealing between relatively moving, parallel, monoplanar faces each having a pair of ports therein with the pair of ports in one face periodically registering with the pair of ports in the other face as the faces move relatively to each other, said face seal structure comprising:
 a disc-shaped seal plate means having:
  a substantially monoplanar bearing and sealing surface on one side thereof, and having a pair of spaced openings therethrough which open through said bearing and sealing surface and are positioned therein for concurrent registration with the ports in said faces as said faces move relative to each other; and
  a sealing portion on the other side thereof surrounding said openings and isolating said openings each from the other; and
 means for keying said seal plate means to one of said parallel monoplanar faces for movement therewith relative to the other of said monoplanar faces.

UNITED STATES PATENT OFFICE
CERTIFICATE OF CORRECTION

Patent No. 3,582,090

June 1, 1971

Jerry L. Lott et al.

It is certified that error appears in the above identified patent and that said Letters Patent are hereby corrected as shown below:

Column 7, line 7, "and" should read -- the --; line 73, the formula "$F_T = F_3 + P_1A_4$" should read -- $F_T = F_3 + F_4 = P_1A_3 + P_3A_4$ --. Column 9, line 39, "$P_1 - A_3$" should read -- $P_1 - P_3$ --. Column 15, after line 75, insert -- cation surrounding said opening, said first and second sealing elements being configured to limit the areas upon which fluid pressure acts on the opposite sides of said sealing plate to minimize the net positive force due to fluid pressure acting to force said planar bearing surface against the face of said other body when the port in the face of said other body is not aligned with said opening. --. Column 16, line 14, cancel "periodically". Column 17, cancel lines 1 - 7.

Signed and sealed this 9th day of November 1971.

(SEAL)
Attest:

EDWARD M. FLETCHER, JR.
Attesting Officer

ROBERT GOTTSCHALK
Acting Commissioner of Patents